Oct. 25, 1960
K. LAMB
2,957,630
TORCH WITH INTERNAL POWDER FEED
Filed Oct. 22, 1957
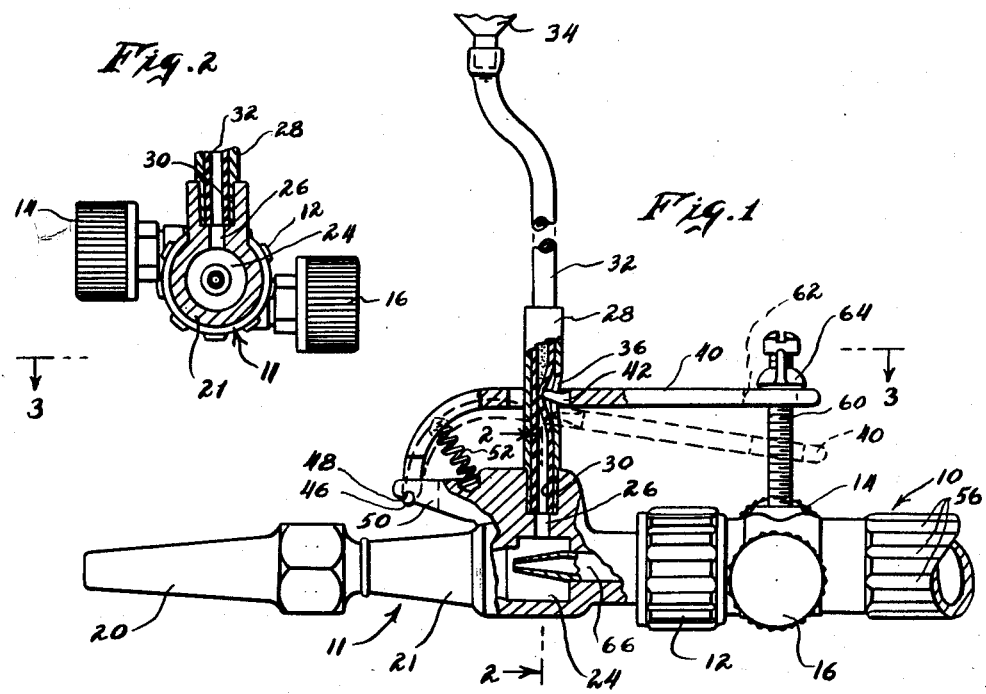
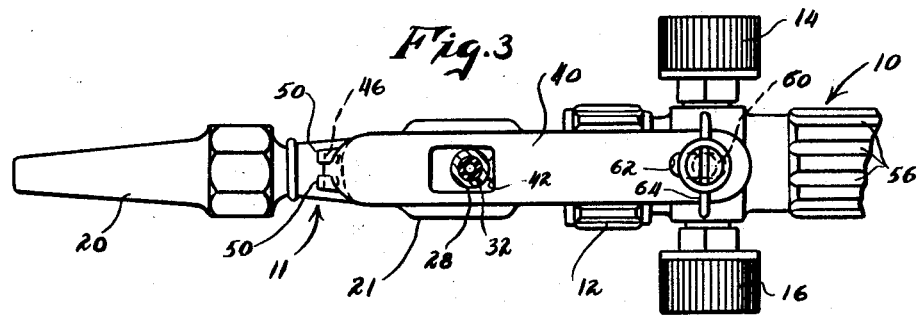
INVENTOR.
Kenneth Lamb
BY Emery, Whittemore,
Sandoe & Dix
ATTORNEYS United States Patent Office 2,957,630
Patented Oct. 25, 1960

2,957,630

TORCH WITH INTERNAL POWDER FEED

Kenneth Lamb, Valencia, Pa., assignor to Coast Metals, Inc., Little Ferry, N.J., a corporation of Delaware Filed Oct. 22, 1957, Ser. No. 691,588

7 Claims. (Cl. 239—85)

This invention relates to heating torches that are used for applying powdered material, more especially powdered metal, to surfaces against which the torch flame is directed.

It is a common practice to coat metal surfaces with powdered material which is fused on the work piece to form a continuous coating for hard surfacing or other purposes. One of the ways in which such coatings are applied is by supplying the powdered material into the gas stream of the torch in such a manner that the powder is discharged with the gas at the torch tip and passes through the torch flame into impingement with the surface of the work piece against which the flame is directed.

It is an object of this invention to provide a torch of the character indicated for applying powdered material to a work piece, and with improved means for controlling the supply of powder. At certain times it may be desirable to completely shut off the powder flow while raising the temperature of a particular area of the work piece; but even after the work piece is highly heated and while powder is being supplied to the surface of the work piece, it is often desirable to regulate the rate at which the powder is supplied and to be able to regulate the powder supply quickly and in accordance with the judgment of the torch operator as he watches the application of the powdered metal, or other material, to the surface of the work piece.

It is another object of this invention to provide improved means for varying the rate of powder flow during the operation of the torch; and it is a more particular object to provide valve means which are controlled by a handle in position to be manipulated by the operator with the same hand with which he grips the torch. Another object is to provide a construction in which the flow of the powder is controlled by means which are quickly responsive to the operation of a handle or other actuator under the control of the operator of the torch.

Other objects, features and advantages of the invention will appear or be pointed out as the description proceeds.

In the drawing, forming a part hereof, in which like reference characters indicate corresponding parts in all the views;

Figure 1 is a fragmentary view, partly in section, showing a portion of a torch with valve means for controlling the flow of powder into the gas passage of the torch;

Figure 2 is a sectional view taken on the line 2—2 of Figure 1; and

Figure 3 is a top plan view of the torch and a sectional view of the powder supply passage, the section through the powder supply passage being taken on the line 3—3 of Figure 1.

The torch shown in the drawing includes a body portion 10 and a tip portion 11 secured to the body portion 10 by a tip nut 12. The flow of gas through the torch is controlled by knobs 14 and 16 which operate oxygen and fuel gas valves, respectively, in accordance with conventional torch design. The tip portion 11 has a tip 20 screwed to an adapter 21.

Within the adapter 21 there is a chamber 24 into which powdered metal flows by gravity through a supply passage having an outlet end 26 at the top of the chamber 24. The gas supply passage includes also a rigid tube 28, the lower end of which extends into a recess or counterbore 30 immediately above the outlet end 26 of the passage. A resilient tube 32 extends through the rigid tube 28 and connects with a powder hopper 34.

There is an opening 36 in the back of the rigid tube 28. A handle 40 has a finger 42 which extends through the opening 36 and into contact with the resilient tube 32. Pressure of the finger 42 against the wall of the tube 32 deforms the tube and reduces the cross section of the open passage through the tube. When the tube 32 is fully collapsed, as shown in Figure 1, the flow of powder is shut off.

The rigid tube 28 is preferably made of metal. It may be screwed into the counterbore 30 or it may be permanently secured by brazing or by insertion as a force fit. The resilient tube 32 is preferably made of rubber, the rubber being one which is capable of withstanding heat without deterioration, such as a silicone rubber. In the construction illustrated, the torch is movable independently of the powder hopper 34 within the limits of movement imposed by the length of the tube 32. For greater portability, the hopper 34 can be mounted directly on the upper end of the rigid tube 28, but this necessitates the use of a relatively small hopper in order to prevent the torch from being unduly heavy at the tip end. Even with the hopper 34 located on the upper end of the tube 28 and thus supported from the torch, the portion of the tube 32 within the rigid tube 28 is used to control the flow of powder.

The handle 40 has a pin 46 at its forward end and this pin engages bearings 48 at the forward ends of brackets 50 extending from the upper part of the adapter 21. A helical spring 52 has its opposite ends located in recesses in the adapter 21 and handle 40, respectively; and this spring holds the pin 46 in the bearings 48 and urges the handle 40 to swing counter-clockwise around the pin 46 as a pivot.

Movement of the handle 40 about the pin 46 is limited by contact of the finger 42 with the resilient tube 32. The force of the spring 52 causes the finger 42 to press the tube 32 against the inside face of the rigid tube 28 and the resilient tube is thus collapsed by the pressure of the spring 52. The rigid tube 28 in the region of the opening 36, the portion of the resilient tube 32 in this same region, and the finger 42 of the handle 40 constitute "valve means" located along the length of the powder passage, for controlling the flow of powder.

The handle 40 preferably extends part way along the body portion of the torch. Part of the length of the body portion 10 has ribs 56 and constitutes a grip portion by which the torch is held when in use. It is one feature of the invention that the handle 40 extends close enough to the grip portion of the torch to permit an operator to manipulate the handle 40 with the thumb of the hand by which he grips the torch. Depressing of the handle 40 from the full line position to the dotted line position shown in Figure 1, causes the finger 42 to move outwardly so that the resilient tube 32 springs back to its original cylindrical shape and the passage through the tube 32 is thus opened for the flow of powder.

Means are provided for adjusting the handle 40 so that it remains open without being held. This means includes a threaded stud 60 secured at its lower end to the body portion of the torch. The threaded stud 60 extends through a slot 62 in the handle 40; and there is a wing nut 64 on the threaded stud 60 above the handle 40. This nut 64 provides an abutment for limiting the movement of the spring 52 and finger 42 so that the spring can not close the valve means. It will be evident that the degree of opening of the valve means depends upon how far down tthe nut 64 is screwed on the stud 60.

Within the tip portion 11 there is a nozzle 66 having a pointed discharge end at the front of the chamber 24. A mixture of oxygen and fuel gas flows through the nozzle 66 from the body portion of the torch; and this gas flow provides an aspirator action for withdrawing powder from the chamber 24. Since the flow of powder through the powder supply passage depends partly upon gravity and partly upon suction of the aspirator, the flow of powder is proportional to the gas flow because the suction of the aspirator depends upon the amount of gas discharged by the nozzle 66.

In the operation of the torch, the valve means are opened only when there is a stream of gas flowing through the torch and in which the powder can be entrained for travel to and through the torch tip 20. Since the valve means are located close to the chamber 24 and the cross section of the powder passage is small, the length of the powder passage between the valve means and the torch is short and there is very little volume of powder between the valve means and the chamber 24. Thus, when the operator wishes to reduce the rate of flow of powder to the tip, by permitting the handle 40 to move upwardly, there is a rapid response in the rate of powder flow. Similarly, when it is desirable to shut off the powder flow entirely, the response is rapid, there being very little powder left below the valve means when the valve means moves into closed position.

The powder discharge passage and the aspirator which includes the nozzle 66 and chamber 24, can be located closer to the tip 20 than in the construction shown in the drawing, if desired; but there is an advantage in having the powder supply inlet some distance upstream from the tip in order to permit the powder to be accelerated by the gas stream as it approaches the tip. This permits more powder to be fed through the tip without obstructing the one or more orifices in the tip where the gas velocity must be maintained at a value in excess of the rate of flame propagation in order to prevent backfiring.

It is a feature of the construction that the powder supply passage is substantially smaller than the gas passage through the torch so that with the torch in operation, the gas stream can entrain the full supply of powder that can flow through the powder supply passage with the valve means fully open. This metering port action of the powder supply passage can be obtained by a minimum cross section of the passage at any desired location, such as the outlet end 26, the resilient tube 32 or the maximum open position of the valve means.

The preferred embodiment of the invention has been illustrated and described, but changes and modifications can be made and some features can be used in different combinations without departing from the invention as defined in the claims.

What is claimed is:

1. In a torch for supplying powdered metal or the like through a flame to a work piece, a torch body having a gas chamber therein and from which the gas is discharged through a tip, an outer tube extending upwardly from the torch body and communicating, through the side of the torch body, with the chamber, a resilient tube within the outer tube and leading upwardly beyond the outer tube for connection to a source of powder that falls down through the tube by gravity, a lever located outside of the torch body and having an end that extends through an opening in the outer tube above the torch body and into contact with the inner tube for pinching the inner tube to control the rate of powder flow, and an actuator portion of the lever extending adjacent to a handle portion of the torch body.

2. The torch structure described in claim 1 and in which there is a spring urging the lever into position to pinch the inner tube.

3. The torch structure described in claim 1 and in which the lever is pivotally connected to the torch body ahead of the outer tube and the lever extends past the outer tube to a position adjacent to the handle portion of the torch body.

4. The torch structure described in claim 3 and in which the lever straddles the outer tube and the lever has a slot therein through which the outer tube passes.

5. The torch described in claim 1 and in which there is a metering port in line with the outer tube and of smaller cross section than the inside cross section of the resilient tube and through which the powder flows on its way to the chamber in the torch body.

6. The heating torch described in claim 1 and in which there is a spring turging the lever into position to pinch the resilient tube, and there is an adjustable screw-threaded element movable into different positions for holding the lever in various positions in which the resilient tube is open to any desired degree.

7. A heating torch having a tip and a body portion having a passage through which gas flows to the tip, and having a powdered metal supply passage opening into the gas passage, valve means located along the supply passage for controlling the flow of powder through said supply passage, a handle connected with the valve means and movable into different positions to close the valve means or open them in various degrees, a spring urging the valve means into closed positions, means for maintaining a minimum opening of the valve means during manual operation of the handle, including an abutment movable into position to limit the stroke of the valve means toward closed position, the abutment being adjustable to change the stroke of the valve means and the resulting degree of opening of the valve means when movement of said valve means is stopped by said abutment.

References Cited in the file of this patent

UNITED STATES PATENTS

| | | |
|---|---|---|
| 2,786,779 | Long et al. | Mar. 26, 1957 |
| 2,787,497 | Kough | Apr. 2, 1957 |
| 2,820,670 | Charlop et al. | Jan. 21, 1958 |
| 2,832,560 | Grigsby | Apr. 29, 1958 |

FOREIGN PATENTS

| | | |
|---|---|---|
| 604,686 | Great Britain | July 8, 1948 |